E. BARBER.
Tailor's Measure.
No. 539.
Patented Dec. 26, 1837.
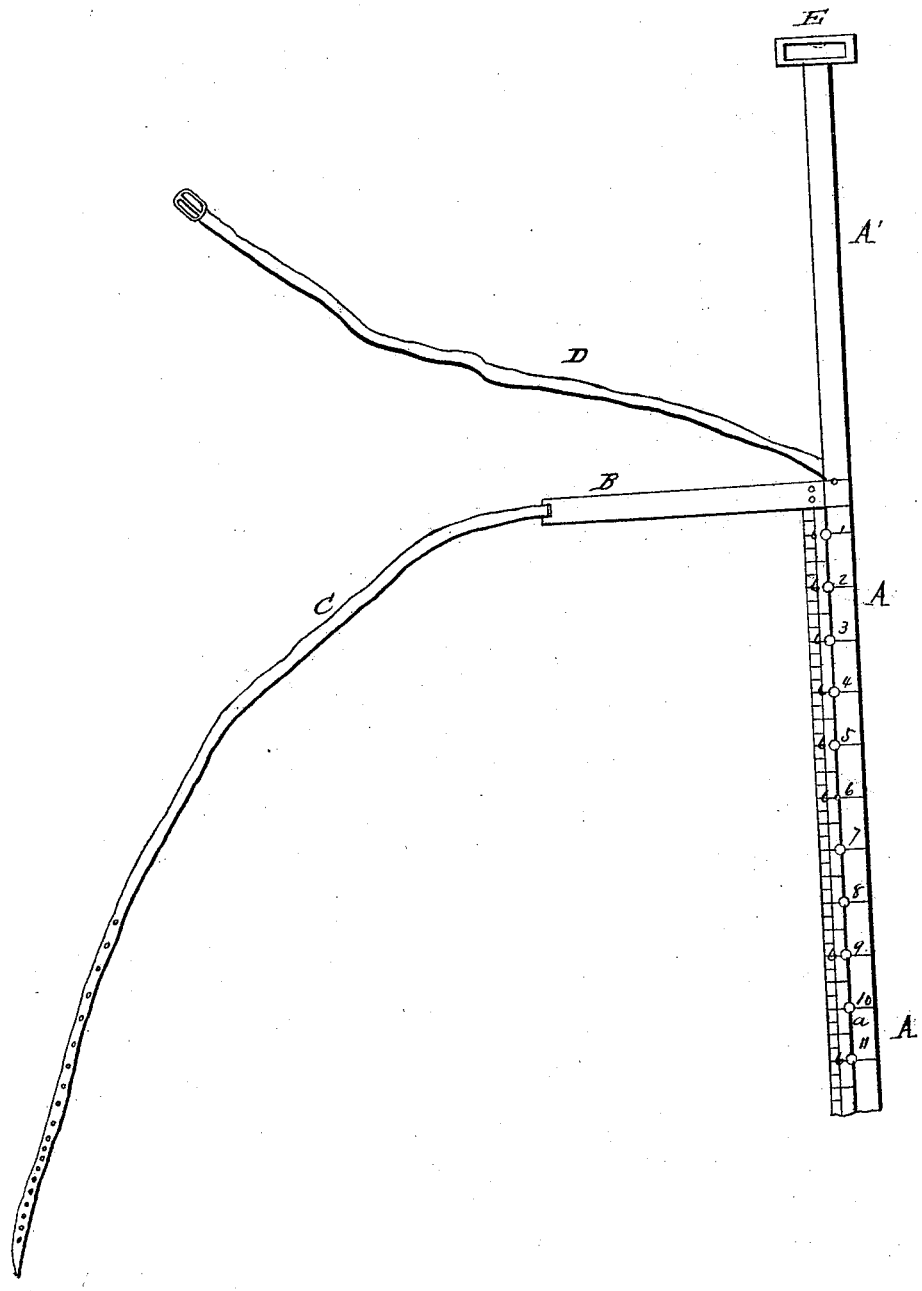

UNITED STATES PATENT OFFICE.

ERASTUS BARBER, OF BOSTON, MASSACHUSETTS.

STANDARD MEASURER FOR TAKING MEASURE FOR COATS.

Specification of Letters Patent No. 539, dated December 26, 1837.

*To all whom it may concern:*

Be it known that I, ERASTUS BARBER, of the city of Boston, in the State of Massachusetts, have invented an Improved Instrument for Taking Measure for Coats, which instrument I denominate the "Standard Measurer;" and I do hereby declare that the following is a full and exact description thereof.

Various instruments and devices have been employed for the purpose of taking measure of the body preparatory to the cutting of garments, but all of them, as I believe, based upon principles differing from that upon which my system is dependent. The instrument which I use consists of strip of metal, which is to be attached, by means of suitable straps, to the body of the person to be measured, so that it shall form a perfectly perpendicular line, from which line all the admeasurements are taken, so as to start from, or terminate in it. This strip of metal, or standard, has a second piece, or strip, attached to, and standing at right angles with it, the only use of which is to guide in affixing the standard correctly, which requires that the zero, or naught, of its divisions, as those divisions are usually marked upon it, should be exactly in a line with the underside of the arm. The measuring is effected by the ordinary measuring tape.

In the accompanying drawing, the whole instrument is shown of one half the real size. A, A, A, is the standard, the lower part of which, A, A, I generally make of thin steel, and the upper part, A′, of brass. The rectangular piece, B, is also best made of spring steel.

C, and D, are the straps by which the standard is to be fixed upon the person to be measured. To ascertain that the standard is placed vertically, there is a spirit level, E, at the upper end of the standard A′.

When the standard is to be fixed, for measuring, the strip B, is passed under the right arm of the person to be measured, the part, A′, passing up just at the front of it; the strap, C, passes around the body under both arms, and up over the left shoulder to the back of the neck, where it is buckled to the strap, D, which passes over the right shoulder, and meets it.

It will be seen, that there is a line, $a, a, a$, corresponding with the inner edge of the brass, or upper, part of the standard; this constitutes the true line of the standard, from which all the measurements proceed. The standard is divided into inches, numbered 1, 2, 3, &c., from the 0, corresponding with the bottom of the scye, downward, and at each of the divisions there is a small button, $b, b, b$, exactly on the standard line, onto which buttons the end of the measuring tape is to be passed, this being provided with a suitable hole for that purpose. From either of these divisions, on the standard, the distance to the back seam is to be taken, and noted down, as appertaining to that division, and the same is to be done from the standard to the front of the coat. As many lines may be thus taken, and from as many points, as may be deemed necessary.

When the drafting is to be effected, the standard is to be placed upon the cloth, in such a situation as shall be suitable for laying off the different admeasurements, forward and backward, as will be readily understood by every competent workman, these being laid down upon the cloth from the standard line, exactly as they were taken from the body. This process is as applicable to vests as it is to every variety of coats.

What I claim as new in the above described standard measurer, is—

The manner, or principle, of its construction, so that all the points required in the fitting of the body are obtained from one vertical line, as herein set forth. I also claim the affixing of the standard measurer firmly in its place, by means of straps, or otherwise, thus insuring correctness in the operation, notwithstanding any moving about of the person who is being measured.

ERASTUS BARBER.

Witnesses:
R. W. GERRY,
C. H. ROBINSON.